S. S. BENT.
Hook for Supporting Carriage Poles.
No. 89,118.
Patented April 20, 1869.
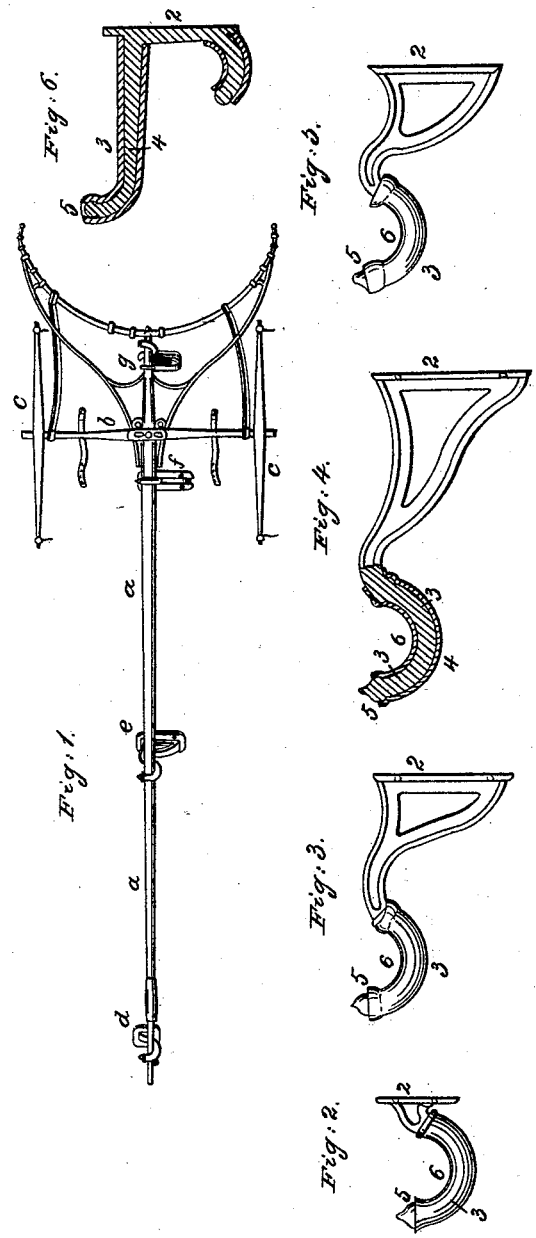

SAMUEL S. BENT, OF PORTCHESTER, NEW YORK.

Letters Patent No. 89,118, dated April 20, 1869.

IMPROVED HOOK FOR SUPPORTING CARRIAGE-POLES.

The Schedule referred to in these Letters Patent and making part of the same.

*To all whom it may concern:*

Be it known that I, SAMUEL S. BENT, of Portchester, in the county of Westchester, and State of New York, have invented, made, and applied to use a certain new and useful Improvement in Hooks for Carriage-Poles and Harness; and I do hereby declare the following to be a full, clear, and exact description of the said invention, reference being had to the annexed drawing, making part of this specification, wherein—

Figure 1 is a perspective view, illustrating the manner in which a carriage-pole may be hung on my improved hooks;

Figures 2, 3, 4, and 5, are elevations of the hooks adapted to receive the pole. (In fig. 4 the outer portion of the hook is shown in section;) and Figure 6 is a section of my said hook in the shape especially adapted to harness.

Similar marks of reference denote the same parts.

The highly-polished carriage-poles and harness now frequently employed, especially in private equipages, are liable to become scratched and defaced by being hung up in the stable.

My invention consists in a pole and harness-hook, formed with a tube or surface of India rubber stretched upon the metal arm of the hook, so as to form an elastic cushion for the pole or harness to rest upon, and thereby avoid the injury resulting heretofore from scratches or from the weight of the article resting upon a small or hard surface.

In the drawing—

$a$ represents the pole.

$b$ and $c\ c$, the whiffle-trees, of any usual or desired construction.

$d\ e\ f\ g$ are the hooks, sustaining the pole.

These hooks require to be of different lengths, as seen in figs. 2, 3, 4, and 5, in order to accommodate the curve in the pole at and behind the whiffle-trees.

Each hook is made with a flange, 2, which is screwed up in place; and from this flange the arm projects of the desired length and shape.

The India-rubber tube 3 is slipped upon the arm 4, and is not easily removed therefrom, in consequence of the tube contracting around the metallic arm; and as an additional security, collars or knobs may be made, as at 5.

The arm 4, figs. 2, 3, 4, and 5, forms nearly a semicircular crotch for the carriage-pole to rest in, as at 6.

The harness-hook, fig. 6, is made with the tubular India-rubber elastic surface 3, and is to have one, two, or more hooks projecting from the flange 2, of any desired length.

What I claim, and desire to secure by Letters Patent, is—

A hook for carriage-poles or harness, formed with an elastic tubular surface, as and for the purposes set forth.

In witness whereof, I have hereunto set my signature, this 19th day of December, 1868.

SAMUEL S. BENT.

Witnesses:
 GEO. D. WALKER,
 GEO. T. PINCKNEY.